(12) United States Patent
Chi

(10) Patent No.: US 12,187,189 B2
(45) Date of Patent: *Jan. 7, 2025

(54) VEHICLE ROOF RACK

(71) Applicant: EVERMORE INTERNATIONAL GROUP CO., LTD., George Hill (AI)

(72) Inventor: Wade Chi, Taipei (TW)

(73) Assignee: EVERMORE INTERNATIONAL GROUP CO., LTD., George Hill (AI)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,784

(22) Filed: Nov. 9, 2023

(65) Prior Publication Data

US 2024/0075872 A1    Mar. 7, 2024

Related U.S. Application Data

(63) Continuation-in-part of application No. 17/843,134, filed on Jun. 17, 2022, now Pat. No. 11,859,789.

(51) Int. Cl.
| | | |
|---|---|---|
| *B60Q 1/26* | (2006.01) | |
| *B60R 9/058* | (2006.01) | |
| *F21S 4/28* | (2016.01) | |
| *F21Y 115/10* | (2016.01) | |

(52) U.S. Cl.
CPC ............ *B60Q 1/2611* (2013.01); *B60R 9/058* (2013.01); *F21S 4/28* (2016.01); *F21Y 2115/10* (2016.08)

(58) Field of Classification Search
CPC .................................................... F21S 43/245
See application file for complete search history.

(56) References Cited

U.S. PATENT DOCUMENTS

| | | | |
|---|---|---|---|
| 2016/0052445 A1* | 2/2016 | Huang | B60Q 1/44 |
| | | | 362/520 |
| 2018/0326915 A1 | 11/2018 | Dickinson | |
| 2020/0114809 A1* | 4/2020 | Chen | B60Q 1/2661 |
| 2020/0114829 A1* | 4/2020 | Chen | F21S 43/15 |
| 2020/0406812 A1* | 12/2020 | Molines | B60Q 1/32 |
| 2023/0071785 A1* | 3/2023 | Bauer | B60Q 1/2611 |
| 2023/0084444 A1* | 3/2023 | Bauer | B60Q 1/2696 |
| | | | 224/309 |

* cited by examiner

*Primary Examiner* — Christopher E Dunay
(74) *Attorney, Agent, or Firm* — MUNCY, GEISSLER, OLDS & LOWE, P.C.

(57) ABSTRACT

A vehicle roof rack is provided, including: a main body and a light assembly. The main body includes a plurality of rod members and a plurality of connecting portions, and the plurality of connecting portions are detachably connected with the plurality of rod members to form a frame. At least one of the plurality of rod members includes at least one recession. The light assembly includes at least one light-emitting member and at least one power supply unit electrically connected with the at least one light-emitting member. The at least one light-emitting member is received within the at least one recession, and light emitted from the at least one light-emitting member is projected outward through an opening of the at least one recession.

10 Claims, 11 Drawing Sheets

VEHICLE ROOF RACK

The present invention is a CIP of application Ser. No. 17/843,134, filed Jun. 17, 2022, the entire contents of which are hereby incorporated by reference.

BACKGROUND OF THE INVENTION

Field of the Invention

Description of the Prior Art

A vehicle roof rack, such as a roof tray, a luggage rack, etc., is configured to be assembled to a roof of a vehicle for carrying objects so as to provide a large capacity without occupying the space inside the vehicle and be convenient to use. The conventional vehicle roof rack has a single function and is inconvenient to use in a dark environment. Therefore, a vehicle roof rack with a lighting device is developed.

However, the lighting device is directly assembled to the existing vehicle roof rack so that the lighting device relatively protrudes out of the vehicle roof rack, which is easy to be damaged by collision, inconvenient to be assembled and has poor appearance.

The present invention is, therefore, arisen to obviate or at least mitigate the above-mentioned disadvantages.

SUMMARY OF THE INVENTION

The main object of the present invention is to provide a vehicle roof rack, which has a simple structure and provides lighting effect, preferable appearance and easy assembling.

To achieve the above and other objects, the present invention provides a vehicle roof rack, including: a main body and a light assembly. The main body includes a plurality of rod members and a plurality of connecting portions, and the plurality of connecting portions are detachably connected with the plurality of rod members to form a frame. At least one of the plurality of rod members includes at least one recession. The light assembly includes at least one light-emitting member and at least one power supply unit electrically connected with the at least one light-emitting member. The at least one light-emitting member is received within the at least one recession, and light emitted from the at least one light-emitting member is projected outward through an opening of the at least one recession.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
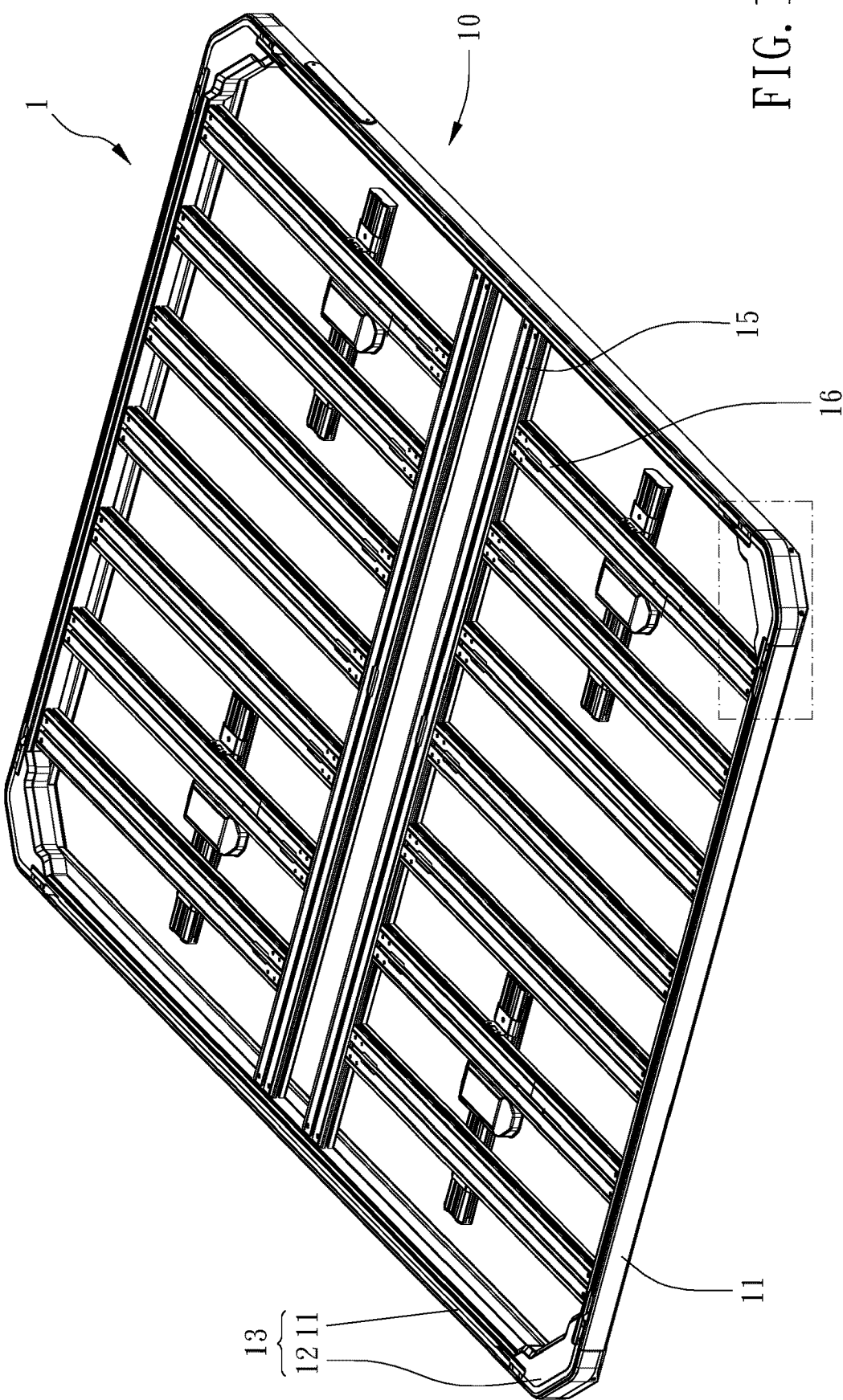
FIG. 1 is a stereogram of a first preferable embodiment of the present invention.
Figure 2:
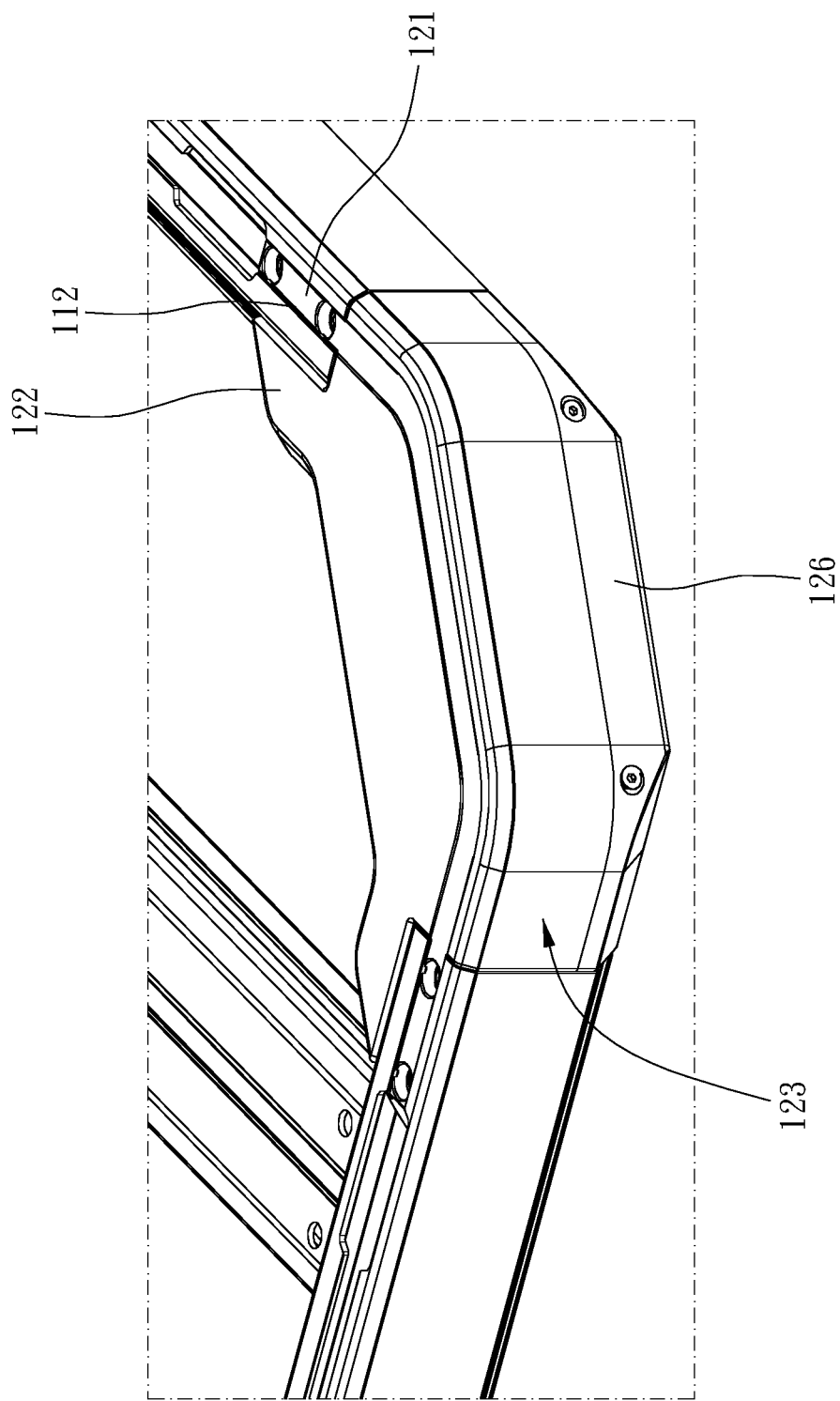
FIG. 2 is an enlargement of FIG. 1.
Figure 3:
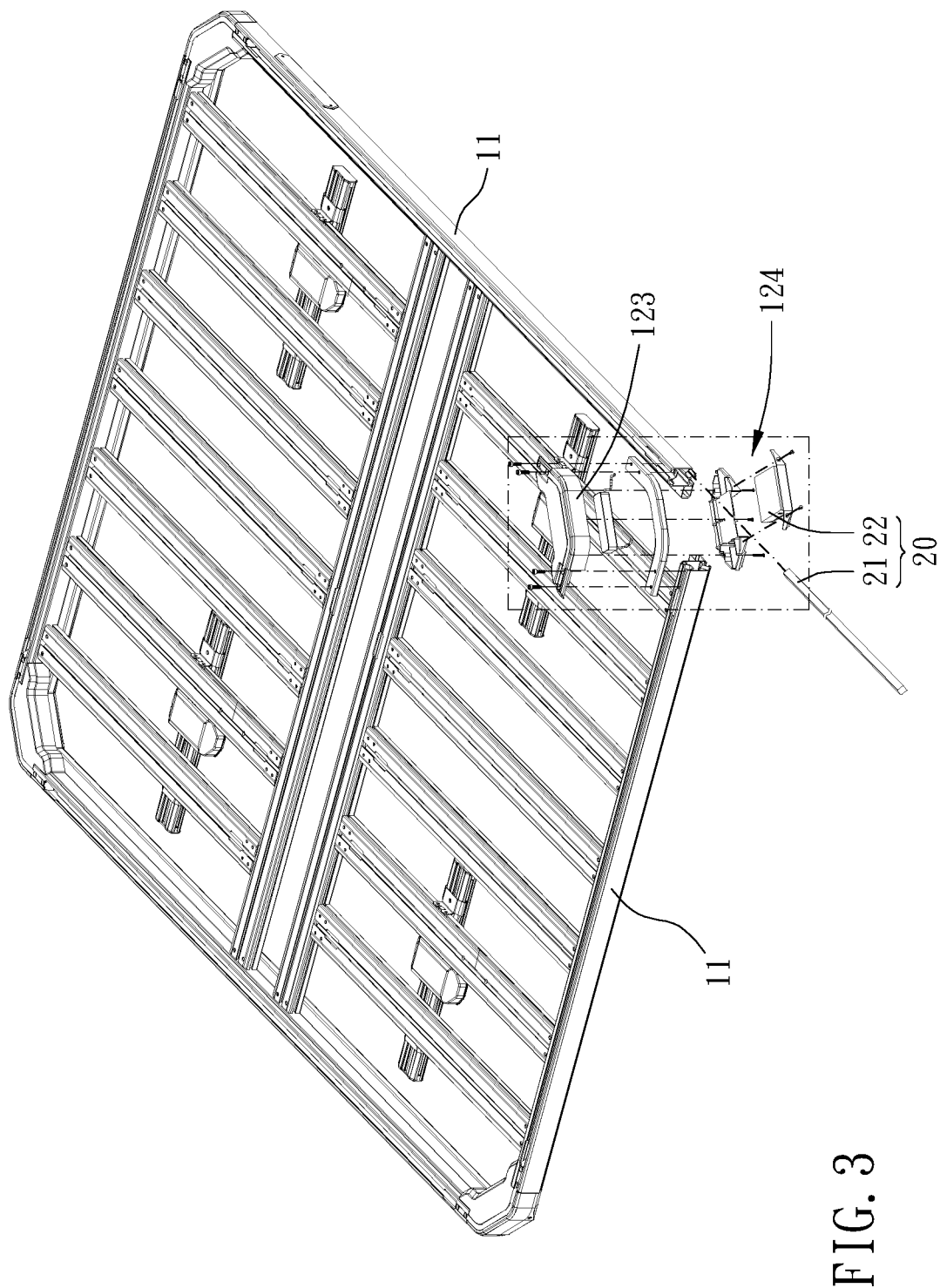
FIG. 3 is a partial breakdown drawing of the first preferable embodiment of the present invention.
Figure 4:
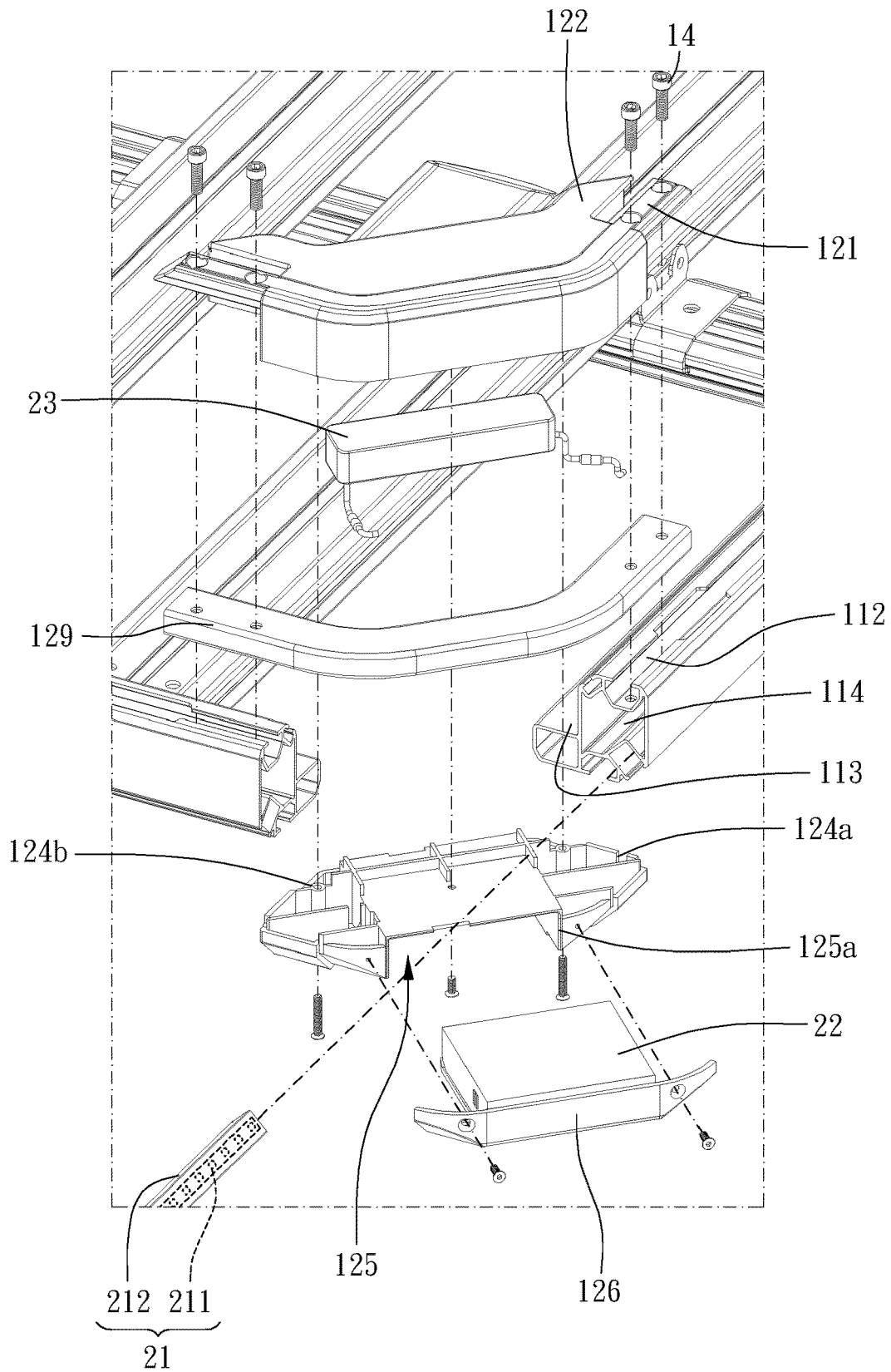
FIG. 4 is an enlargement of FIG. 3.
Figure 5:
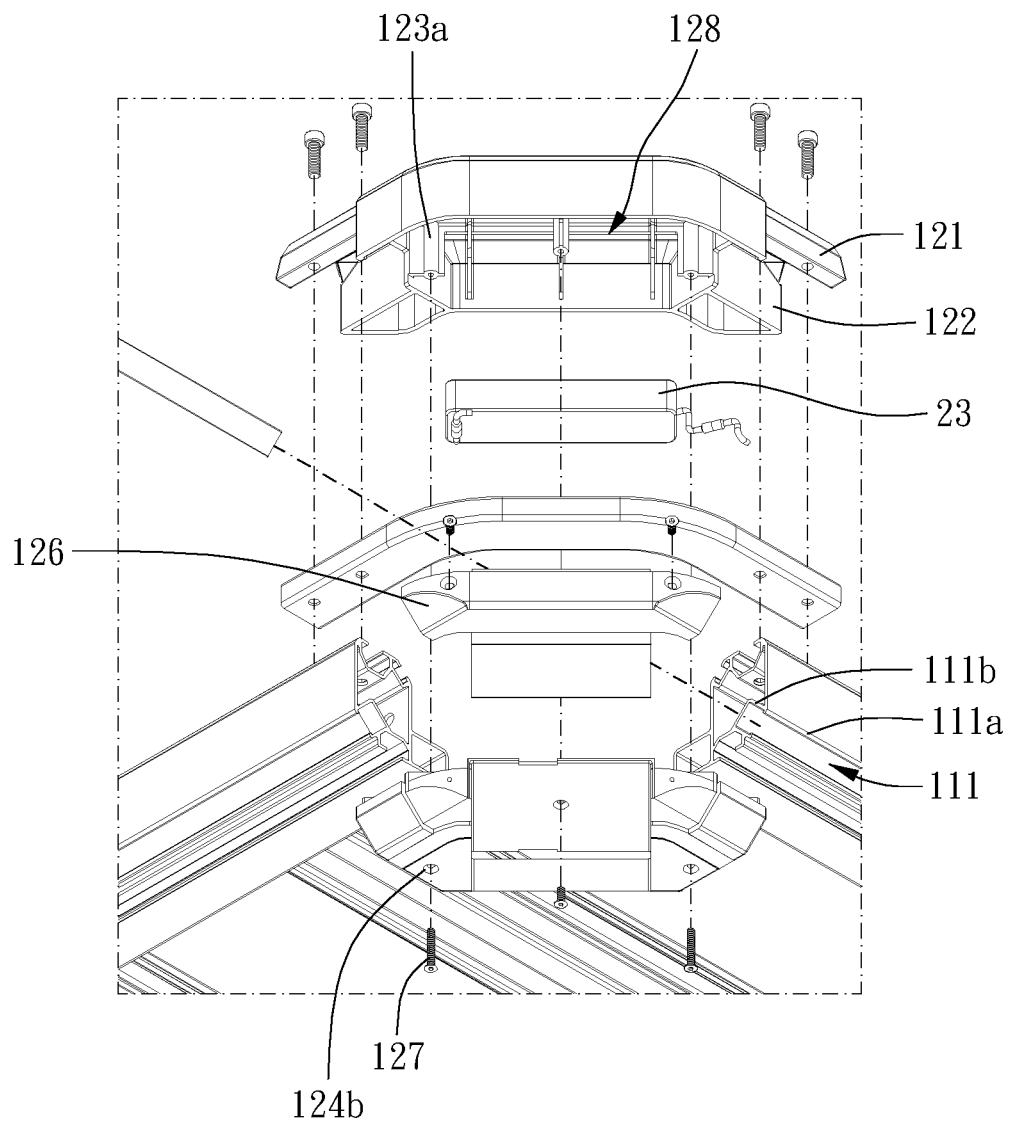
FIG. 5 is a perspective view of FIG. 4 as viewed from another side.

Please refer to FIGS. 1 to 7 for a preferable embodiment of the present invention. A vehicle roof rack 1 of the present invention includes a main body 10 and a light assembly 20.

The main body 10 includes a plurality of rod members 11 and a plurality of connecting portions 12. The plurality of connecting portions 12 is detachably connected with the plurality of rod members 11 to form a frame 13, and at least one of the plurality of rod members 11 includes at least one recession 111 disposed thereon. The light assembly 20 includes at least one light-emitting member 21 and at least one power supply unit 22 electrically connected with the at least one light-emitting member 21. The at least one light-emitting member 21 is received within the at least one recession 111, and light emitted from the at least one light-emitting member 21 is projected outward through an opening 111a of the at least one recession 111. Therefore, the vehicle roof rack 1 has a simple structure and provides lighting effect, preferable appearance and easy assembling.

Each of the at least one recession 111 extends in a longitudinal direction of one of the plurality of rod members 11 and includes at least one end opening 111b open in an end of one of the plurality of rod members 11. Each of the at least one power supply unit 22 is disposed within one of the plurality of connecting portions 12, and each of the at least one light-emitting member 21 is electrically connected with one of the at least one power supply unit 22 through one of said end opening 111b, which avoids wires to be exposed outward and is safe to use. In assembling, the at least one light-emitting member 21 may be inserted into the at least one recession 111 through one of said end opening 111b. The opening 111a of each of the at least one recession 111 is open outward in a direction lateral to the longitudinal direction of one of the plurality of rod members 11, and a width of each of the at least one light-emitting member 21 is larger than a width of the opening 111a of one of the at least one recession 111 so as to stably restrict the at least one light-emitting member 21 without adhesive or fasteners, which has a simple structure and is easy to assemble. In this embodiment, each of the at least one light-emitting member 21 includes a LED strip 211 and a basement 212 surrounded the LED strip 211, and an outer contour of each of said basement 212 corresponds to a cross-sectional contour of one of the at least one recession 111. The basement 212 is relatively rigid and prevents the LED strip 211 from bending arbitrary for easy assembling, and the basement 212 provides waterproof and protection effects. For example, each said basement 212 may include an aluminum base and a lampshade covered on the aluminum base, and the LED strip 211 is arranged between the aluminum base and the lampshade so as to provide uniform light and good heat dissipation. In other embodiments, each said LED strip may be directly attached to a portion of one of the plurality of rod members surrounded one of the at least one recession; the at least one light-emitting member may be other types of light sources.

Two ends of each of the plurality of rod members 11 respectively have a first insertion portion 112 disposed thereon, and two ends of each of the plurality of connecting portions 12 respectively have a second insertion portion 121 connected with one of said first insertion portion 112 and a supporting portion 122. Each of said supporting portion 122 is spaced apart from one of said second insertion portion 121 and abutted against an outer circumferential wall of one of the plurality of rod members 11, which is easy to assemble. Said supporting portions 122 can avoid relative movements between the plurality of connecting portions 12 and the plurality of rod members 11 and disperse force therebetween. In this embodiment, each of the plurality of rod members 11 is an aluminum extruded member, and each of said first insertion portion 112 is an insertion groove integrally formed as a part of one of said aluminum extruded member so as to have a simple structure, lightweight and easy manufacturing. Each of the plurality of rod members 11 further includes a shoulder portion 113 located at an inner side of the frame 13, and each of said supporting portion 122 is abutted against one of said shoulder portion 113 for good assembling stability. In other embodiments, the plurality of rod members may be made by other methods; each of said shoulder portion may be located at an outer side of the frame.

Specifically, each of the plurality of connecting portions 12 includes an upper cover 123 and a lower cover 124 which are detachably assembled with each other. At least one of the upper cover 123 and the lower cover 124 has a notch 124a communicated with one of the at least one recession 111, and the at least one notch 124a is configured for a wire of the at least one light-emitting member 21 to be arranged therethrough. One of the upper cover 123 and the lower cover 124 of at least one of the plurality of connecting portions 12 includes a first receiving portion 125 receiving the at least one power supply unit 22 therewithin and a drawing member 126. The first receiving portion 125 has at least one mouth 125a, and the drawing member 126 openably closes the at least one mouth 125a, which is convenient to assemble and disassemble the at least one power supply unit 22 for replacement or charging. Moreover, one of the upper cover 123 and the lower cover 124 has a plurality of first connecting holes 123a, and the other of the upper cover 123 and the lower cover 124 has a plurality of second connecting holes 124b corresponding to the plurality of first connecting holes 123a. The upper cover 123 and the lower cover 124 are connected with each other by a plurality of locking members 127 engaged within the plurality of first connecting holes 123a and the plurality of second connecting holes 124b, which is convenient to be positioned and assembled. In other embodiments, one of the upper cover and the lower cover may have a plurality of positioning protrusions, the other of the upper cover and the lower cover may have a plurality of positioning recessions so as to achieve similar effects.

The light assembly 20 further includes at least one control unit 23, and the upper cover 123 and the lower cover 124 of at least one of the plurality of connecting portions 12 define a second receiving portion 128 therebetween. The at least one control unit 23 is received within the second receiving portion 128 and electrically connected with the at least one power supply unit 22 so that the at least one control unit 23 can control operation of the at least one light-emitting member 21. In this embodiment, each of said first receiving portion 125 is located at a side of one of said lower cover 124 remote from one of said second receiving portion 128 for good heat dissipating effect; the upper cover 123 and the lower cover 124 of each of the plurality of connecting portions 12 are made of plastic materials, and each of said second insertion portion 121 is a projection integrally formed as a part of one of said upper cover 123. Each of said projection is inserted into one of said insertion groove so as to have good structural strength. In other embodiments, each of said first insertion portion may be a projection, and each of said second insertion portion may be an insertion groove.

Figure 6:
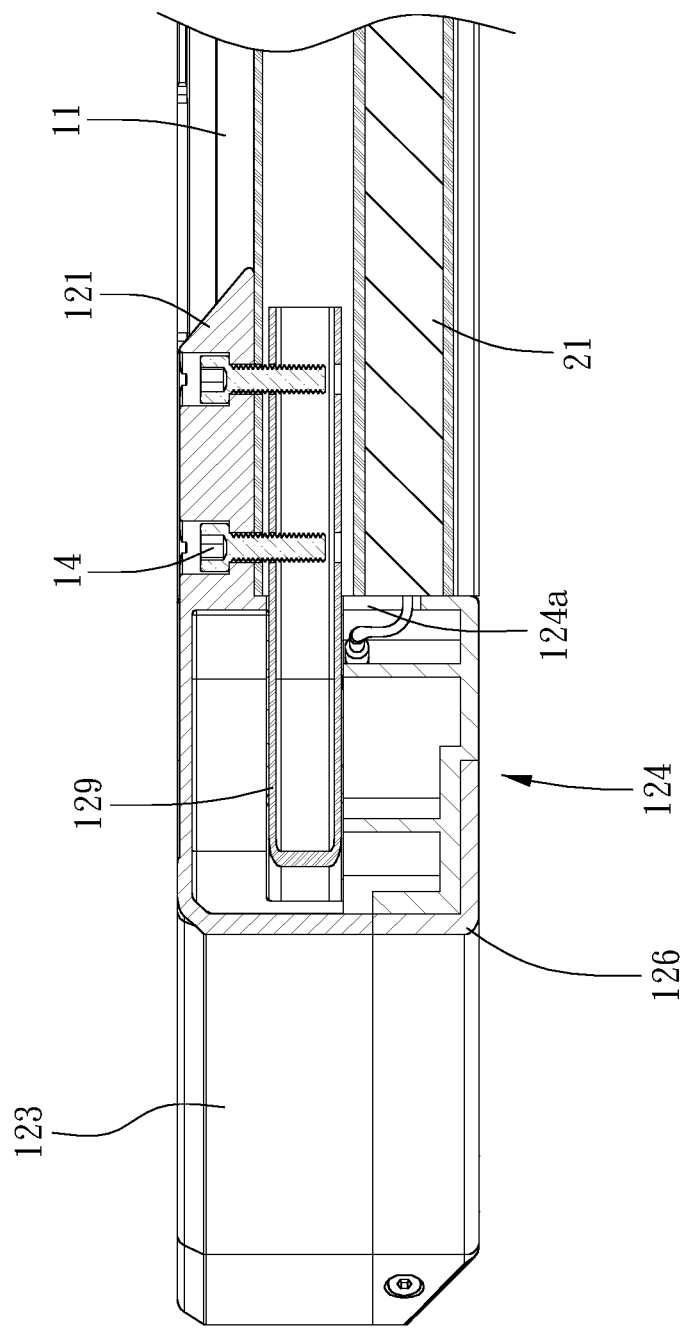
FIG. 6 is a partial cross-sectional view of the first preferable embodiment of the present invention.
Figure 7:
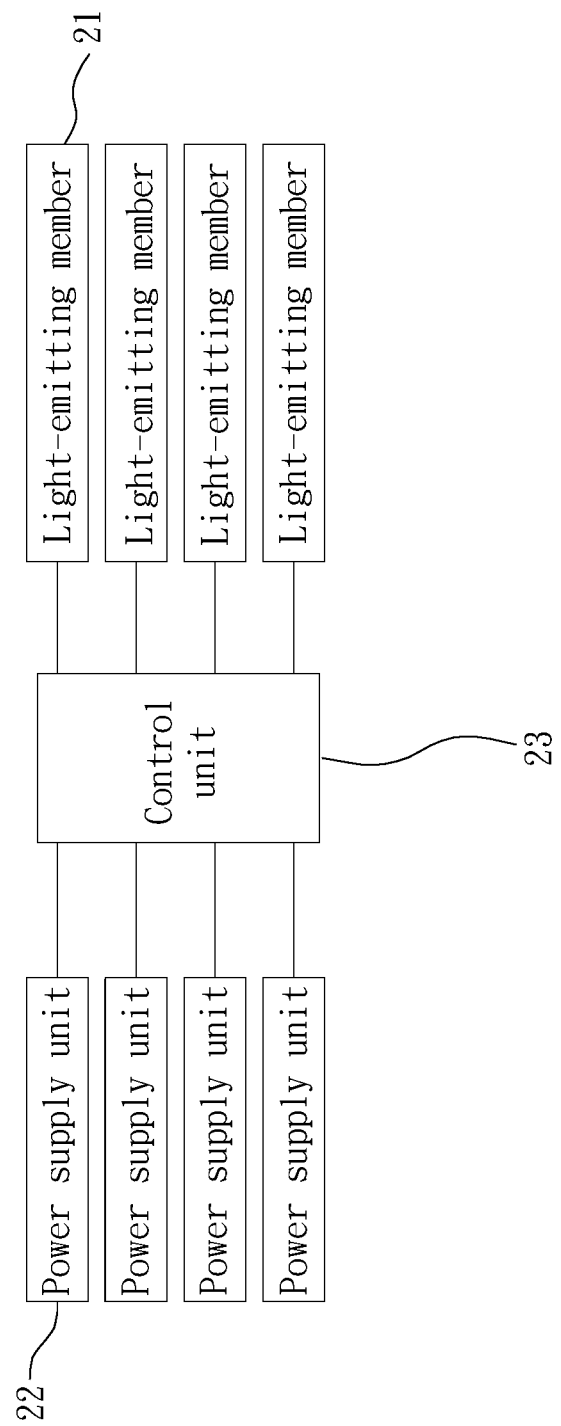
FIG. 7 is a block diagram according to the first preferable embodiment of the present invention.

Preferably, each of the plurality of connecting portions 12 further includes a reinforcing member 129 disposed between the upper cover 123 and the lower cover 124, and each of the plurality of rod members 11 includes a hollow portion 114. Two ends of each of said reinforcing member 129 respectively penetrate into the hollow portion 114 of one of the plurality of rod members 11, and one of said reinforcing member 129, one of the plurality of rod members 11 and at least one of the upper cover 123 and the lower cover 124 are connected with one another by a plurality of fasteners 14, as shown in FIG. 6, so as to increase structural strength and assembling stability. In this embodiment, each of said reinforcing member 129 is a hollow tube which may be made of metal or plastic for lightweight.

Figure 8:
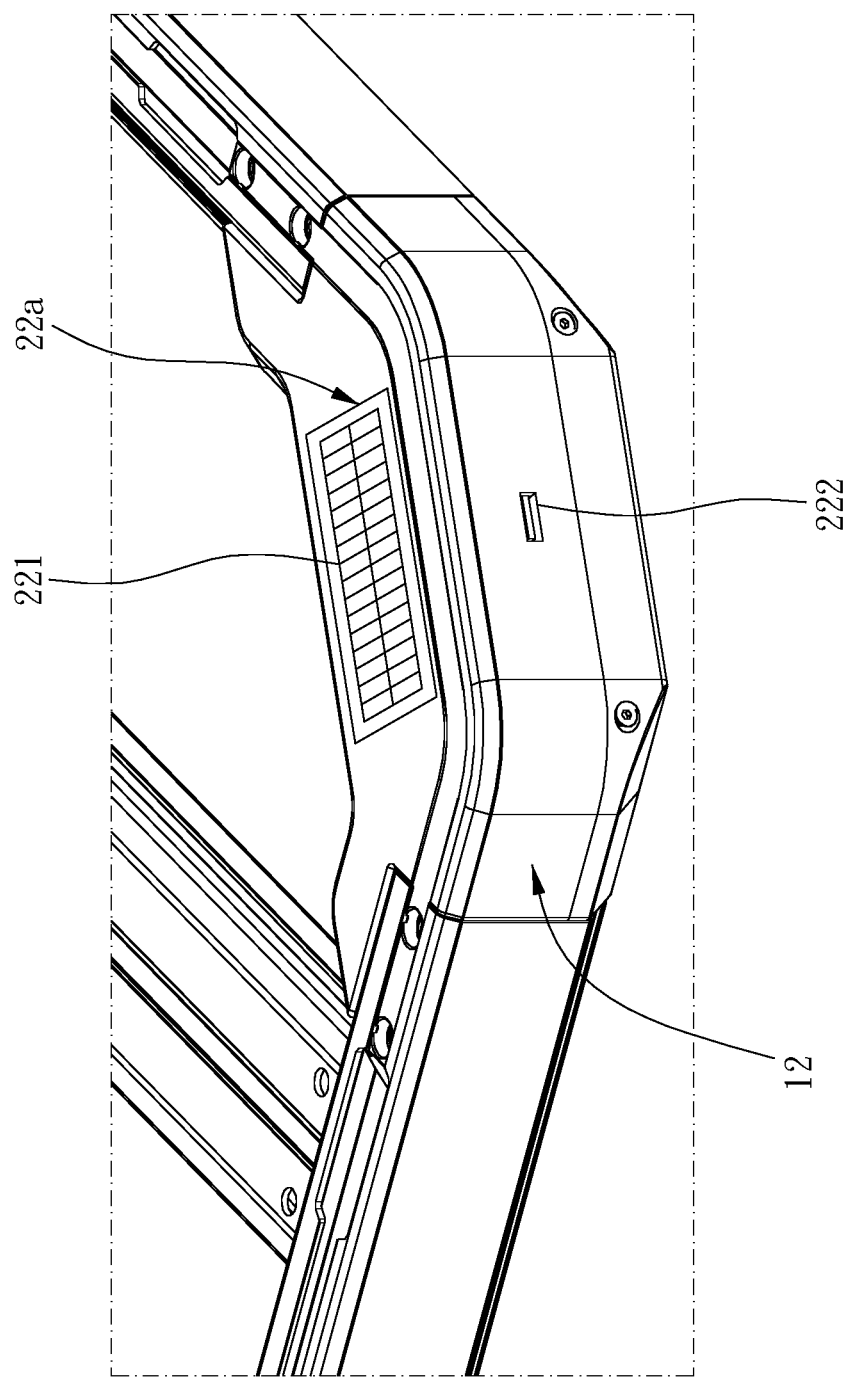
FIG. 8 is a partial enlargement of a second preferable embodiment of the present invention.

The at least one power supply unit 22 includes at least one of a battery, a solar cell, an electrical interface (such as USB ports, DC ports, etc.) and a vehicle power. In this embodiment, the main body 10 includes four said rod members 11 and four said connecting portions 12, and an outer contour of the frame 13 is octagonal; the light assembly 20 includes four said power supply units 22 which are electrically connected with the same one of said control unit 23, and each of the four said power supply units 22 includes a battery and supplies power to respective one of said light-emitting members 21 so that the four said power supply units 22 can be replaced or charged individually; each of the plurality of rod members 11 has one of said recession 111 extending and being open in the longitudinal direction, each of said recession 111 has at least one of said light-emitting member 21 received therewithin. The main body 10 further includes at least one first cross rod 15 and a plurality of second cross rods 16. Each of the at least one first cross rod 15 is detachably arranged between two of the plurality of rod members 11, and each of the plurality of second cross rods 16 is detachably arranged between one of the at least one first cross rod 15 and one of the plurality of rod members 11 corresponding to each other. Arrangements of the at least one first cross rod 15 and the plurality of second cross rods 16 are changeable to meet various requirements. In other embodiments, the at least one power supply unit 22a may include a solar cell 221 and a USB port 222 disposed on one of the plurality of connecting portions 12, as shown in FIG. 8, so as to provide various methods for power supply.

Figure 9:
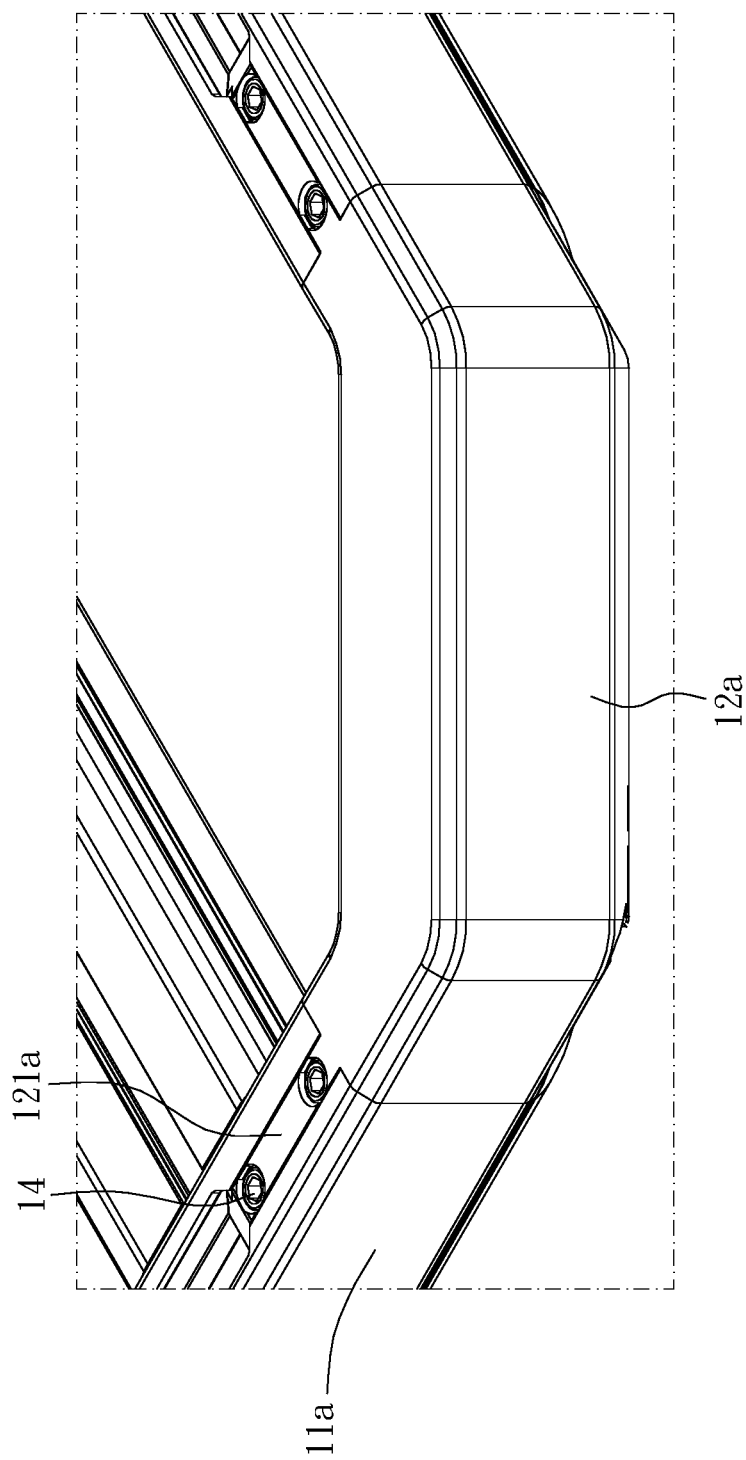
FIG. 9 is a partial enlargement of a third preferable embodiment of the present invention.
Figure 10:
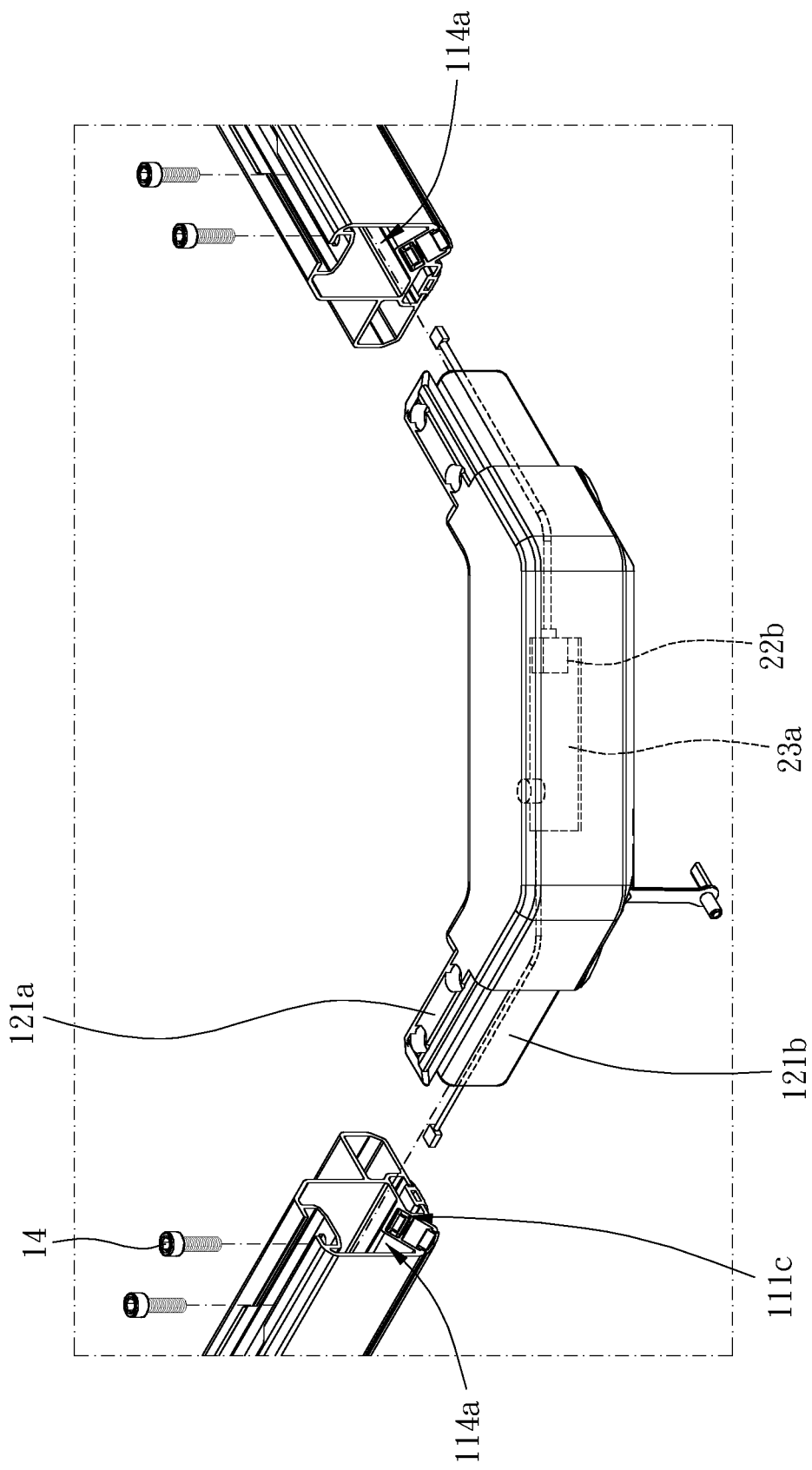
FIG. 10 is a partial breakdown drawing of the third preferable embodiment of the present invention.
Figure 11:
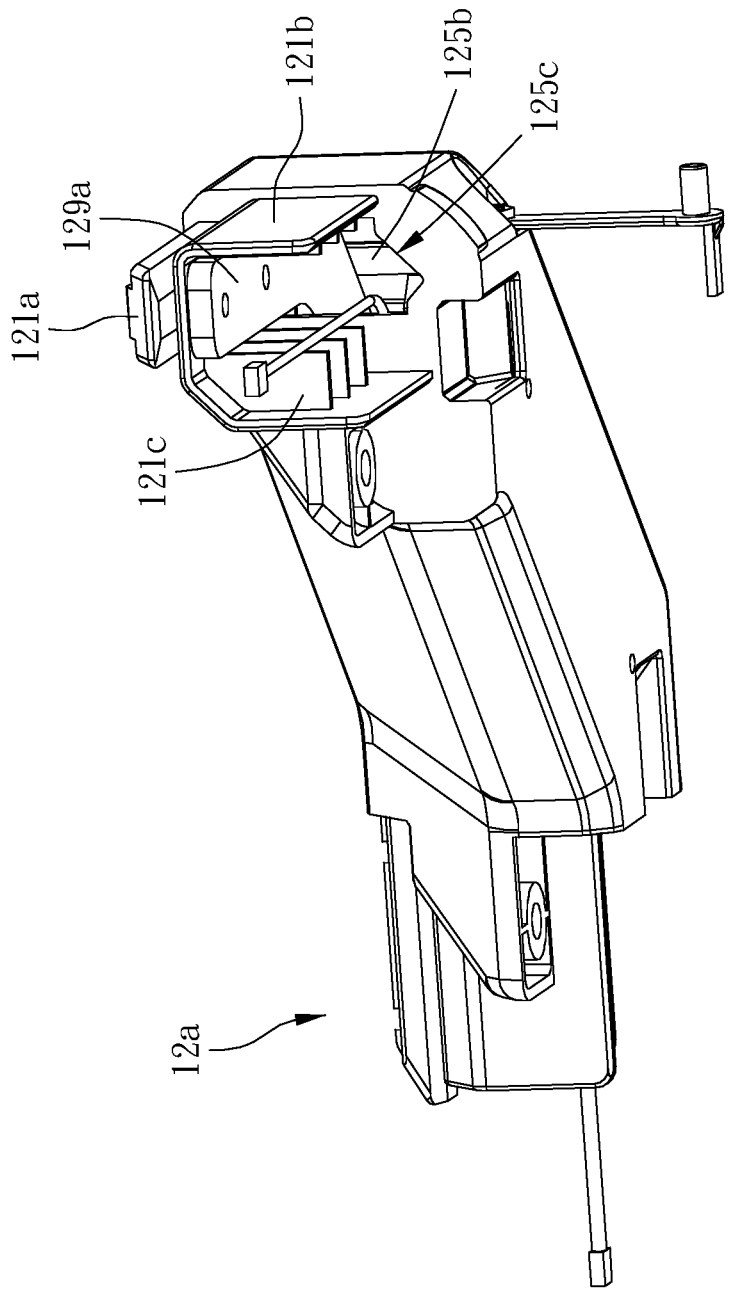
FIG. 11 is a stereogram of a connecting portion with a control unit disposed therewithin according to the third preferable embodiment of the present invention.

Please refer to FIGS. 9-11 showing a third preferable embodiment of the present invention. The third preferable embodiment is different from the first preferable embodiment in that: each of the plurality of connecting portions 12a is integrally formed as one piece and defines a receiving space 125b and at least one communicating opening 125c communicating the receiving space 125b with at least one of the at least one recession 111c. Each of the at least one power supply unit 22b and each of the at least one control unit 23a are received within one of said receiving space 125b. Therefore, cables connecting the at least one power supply unit 22b with the at least one light-emitting member 21 can be arranged through the at least one communicating opening 125c for easy assembling, and the plurality of connecting portions 12a have good waterproof effect and good structural strength.

Specifically, two ends of each of the plurality of connecting portions 12a respectively have a third insertion portion 121b spaced apart from one of said second insertion portion 121a, and each said third insertion portion 121b penetrates within the hollow portion 114a of one of the plurality of rod members 11a. An outer contour of each said third insertion portion 121b at least partially corresponds to a cross-sectional contour of the hollow portion 114a of one of the plurality of rod members 11a to provide stable connection and disperse the force to avoid damage to said second insertion portions 121a due to improper force. As show in FIG. 11, each said third insertion portion 121b is disposed around one said communicating opening 125c and includes a plurality of rib 121c extending inwardly so as to have good structural strength.

Each of the plurality of connecting portions 12a further includes a reinforcing portion 129a integrally extending within the receiving space 125b, and two ends of each of said reinforcing portion 129a respectively extend to one of said third insertion portion 121b and penetrate into the hollow portion 114a of one of the plurality of rod members 11a, which is easy to manufacture and has good structural strength. Similar to the first preferable embodiment, one of said reinforcing portion 129a and one of the plurality of rod members 11a are connected with each other by a plurality of fasteners 14, which is easy to assemble.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle roof rack, configured to be attached to a roof of a vehicle, including:
    a main body, including a plurality of rod members and a plurality of connecting portions, the plurality of connecting portions detachably connected with the plurality of rod members to form a frame, at least one of the plurality of rod members including at least one recession disposed thereon; and
    a light assembly, including at least one light-emitting member and at least one power supply unit electrically connected with the at least one light-emitting member, the at least one light-emitting member being received within the at least one recession, light emitted from the at least one light-emitting member being projected outward through an opening of the at least one recession;
    wherein each of the plurality of connecting portions is integrally formed as one piece and defines a receiving space and at least one communicating opening communicating the receiving space with at least one of the at least one recession, and each of the at least one power supply unit is received within one of said receiving spaces.

2. The vehicle roof rack of claim 1, wherein the at least one power supply unit includes at least one of a battery, a solar cell, an electrical interface and a vehicle power.

3. The vehicle roof rack of claim 1, wherein the opening of each of the at least one recession is open outward in a direction lateral to a longitudinal direction of one of the plurality of rod members, and a width of each of the at least one light-emitting member is larger than a width of the opening of one of the at least one recession.

4. The vehicle roof rack of claim 3, wherein each of the at least one light-emitting member includes a LED strip and a basement surrounded the LED strip, and an outer contour of each of said basement corresponds to a cross-sectional contour of one of the at least one recession.

5. The vehicle roof rack of claim 1, wherein two ends of each of the plurality of rod members respectively have a first insertion portion disposed thereon, two ends of each of the plurality of connecting portions respectively have a second insertion portion connected with one of said first insertion portion and a supporting portion, and each of said supporting portion is spaced apart from one of said second insertion portion and abutted against an outer circumferential wall of one of the plurality of rod members.

6. The vehicle roof rack of claim 5, wherein two ends of each of the plurality of connecting portions respectively have a third insertion portion spaced apart from one of said second insertion portion, each of the plurality of rod members includes a hollow portion, each said third insertion portion penetrates within the hollow portion of one of the plurality of rod members, and an outer contour of each said third insertion portion at least partially corresponds to a cross-sectional contour of the hollow portion of one of the plurality of rod members.

7. The vehicle roof rack of claim 6, wherein each said third insertion portion is disposed around one said communicating opening and includes a plurality of rib extending inwardly.

8. The vehicle roof rack of claim 7, wherein the at least one power supply unit includes at least one of a battery, a solar cell, an electrical interface and a vehicle power; the opening of each of the at least one recession is open outward in a direction lateral to a longitudinal direction of one of the plurality of rod members, and a width of each of the at least one light-emitting member is larger than a width of the opening of one of the at least one recession; each of the at least one light-emitting member includes a LED strip and a basement surrounded the LED strip, and an outer contour of each of said basement corresponds to a cross-sectional contour of one of the at least one recession; the at least one recession includes at least one end opening open in an end of one of the plurality of rod members, each of the at least one light-emitting member is electrically connected with one of the at least one power supply unit through one of said end opening; each of the plurality of rod members is an aluminum extruded member, each of said first insertion portion is an insertion groove integrally formed as a part of one of said aluminum extruded member; each of the plurality of rod members further includes a shoulder portion located at an inner side of the frame, and each of said supporting portion is abutted against one of said shoulder portion; each of the plurality of connecting portions further includes a reinforcing portion integrally extending within the receiving space, two ends of each of said reinforcing portion respectively extend to one of said third insertion portion and penetrate into the hollow portion of one of the plurality of rod members, and one of said reinforcing portion and one of the plurality of rod members are connected with each other by a plurality of fasteners; the light assembly further includes at least one control unit, and each of the at least one control unit is received within one of said receiving space and electrically connected with the at least one power supply unit; the main body further includes four said rod members and four said connecting portions, an outer contour of the frame is octagonal; each of the at least one power supply unit includes a battery; each of the plurality of rod members has one of said recession extending and being open in the longitudinal direction, and each of said recession has at least one of said light-emitting member received therewithin; and the main body further includes at least one first cross rod and a plurality of second cross rods, each of the at least one first cross rod is detachably arranged between two of the plurality of rod members, and each of the plurality of second cross rods is detachably arranged between one of the at least one first cross rod and one of the plurality of rod members corresponding to each other.

9. The vehicle roof rack of claim 1, wherein each of the plurality of connecting portions further includes a reinforcing portion integrally extending within the receiving space, each of the plurality of rod members includes a hollow portion, two ends of each of said reinforcing portion respectively penetrate into the hollow portion of one of the plurality of rod members, and one of said reinforcing portion and one of the plurality of rod members are connected with each other by a plurality of fasteners.

10. The vehicle roof rack of claim 1, wherein the light assembly further includes at least one control unit, and each of the at least one control unit is received within one of said receiving space and electrically connected with one of the at least one power supply unit.

* * * * *